Jan. 23, 1968 P. M. LUCAS ET AL 3,365,548

SELECTIVE ACCESS DEVICE FOR CENTRALIZED TELEPHONE SWITCHING SYSTEMS

Filed Oct. 2, 1964 4 Sheets-Sheet 1

INVENTORS
P. M. LUCAS, J. F. DUQUESNE & G. P. LAGREZE
BY
Abraham A. Saffitz
ATTORNEY Jan. 23, 1968 P. M. LUCAS ETAL 3,365,548

SELECTIVE ACCESS DEVICE FOR CENTRALIZED TELEPHONE SWITCHING SYSTEMS

Filed Oct. 2, 1964 4 Sheets-Sheet 2

INVENTORS

P. M. LUCAS, J. F. DUQUESNE & G. P. LAGREZE

BY

Abraham A. Saffitz

ATTORNEY

Jan. 23, 1968 P. M. LUCAS ETAL 3,365,548

SELECTIVE ACCESS DEVICE FOR CENTRALIZED TELEPHONE SWITCHING SYSTEMS

Filed Oct. 2, 1964 4 Sheets-Sheet 3

INVENTORS
P. M. LUCAS, J. F. DUQUESNE & G. P. LAGREZE
BY
Abraham A. Saffitz
ATTORNEY Jan. 23, 1968 P. M. LUCAS ETAL 3,365,548

SELECTIVE ACCESS DEVICE FOR CENTRALIZED TELEPHONE SWITCHING SYSTEMS

Filed Oct. 2, 1964 4 Sheets-Sheet 4

INVENTORS

P.M. LUCAS, J.F. DUQUESNE & G.P. LAGREZE

BY Abraham A. Saffitz

ATTORNEY

United States Patent Office 3,365,548

Patented Jan. 23, 1968

3,365,548

SELECTIVE ACCESS DEVICE FOR CENTRALIZED TELEPHONE SWITCHING SYSTEMS

Pierre M. Lucas, 20 Rue Henri Tariel, Issy-les-Moulineaux, France; Jean F. Duquesne, 41 Rue Esquiral, Paris, France; and Gaston P. Lagreze, Cite de la Plaine, Clamart, France Filed Oct. 2, 1964, Ser. No. 401,171

Claims priority, application France, Oct. 3, 1963, 949,478

3 Claims. (Cl. 179—18)

ABSTRACT OF THE DISCLOSURE

Recorded program selective access device for centralized telephone switching system between peripheral information senders-and-receivers and a plurality of computers which obviates the risk of double testing, comprising two computers which derive data from a calling subscriber's number and from that of the called subscriber, a first data send storing and transmitting means for sending part of the data to a double test suppressing access device and a second data receiver-and-sender means for storing and transmitting a second part of the data to said double test suppressing access device, the pulses of one of the computers being interlaced with the pulses of the other computer, a plurality of bistable circuits associated with each of the first and second data senders becoming operative when either of the data senders calls for one of the two computers, and gating means connected to the two computers and to the bistable circuits and testing means in each computer capable of transferring parts of the data received from the first data sender and the second data receiver-and-sender.

This invention relates to a system for selective access between peripheral information senders and receivers and a plurality of computers. The invention obviates the risks of double access or double testing and is more particularly an access system for recorded programme type automatic switching equipment for telephones.

The applicants' U.S. patent application Ser. No. 291,401 filed June 28, 1963 issued as U.S. Patent No. 3,274,343 on Sept. 20, 1966 discloses telephone systems comprising a switching network, a central control member for recording, translation, calculation, charging and maintenance, and a number of so-called peripheral circuits which have an independent programme and which deal with route selection, switching control, calling subscribers' lines scanning and supervision. The central control member is a computer wherein the instructions required for the operation of the automatic switchgear are recorded in a semi-permanent memory formed by a magnetic drum from which the orders can be removed in variable sequences in dependence upon the service conditions found.

This application discloses various kinds of circuits having to do with the computer, inter alia preselection route selectors (PRS) and final route selectors (FRS).

The preselection route selectors serve inter alia to receive and store the calling subscriber's number, to select a preselection route between the calling subscriber and a junctor through the subscribers' selection stage and to transmit the calling subscriber's number and the number of the preselected local junctor to the computer, and, in association with the computer at the end of final selection, to receive and check the address number of the calling or called subscriber. Accordingly, the preselection route selectors comprise a junctor register giving the number of the local junctor terminating the preselection route, and a store which at the completion of preselection contain the calling subscriber's number and at the completion of final route selection the calling or called subscriber's number.

The jobs of the final route selectors are inter alia:

To receive the identification numbers of the end points of the final route—i.e., for a local call, the number of the preselected junctor and the address number of the called subscriber and, for toll calls, to receive the number of a toll call junctor and the calling subscriber's number, these items being supplied to the final route selectors by the computer;

To choose the final route which, for a local call, is the extension of the preselected route to the called subscriber and, for a toll-call, is a route connecting the toll-call junctor chosen by the computer to the calling subscriber, and To revertively signal to the computer the address numbers of the end points of the final route for checking, and to revertively signal particulars about the state of the called subscriber's line.

Accordingly, the final route selectors comprise a link register giving the link number—i.e., the number of the junctor from which starts the final route and the tens number of the called subscriber to be connected to the latter junctor, and a store which, from the start of final selection contains the address number of the latter called subscriber.

The computer has access to the junctors via distributors and scanners.

Since the computer is very important in automatic switch-gear of the kind specified, it is advisable to provide at least two independent computers.

The object of this invention is to obviate the problems of simultaneous access between the peripheral members and the two independent computers.

As it will be seen in the following there are two kinds of peripheral members, information senders and information receivers and senders. At certain steps of their program the information senders and the information receivers and senders want to be connected to a computer to transmit information thereto. At certain steps of the program of the computers, the same want to be connected to an information receiver and sender to have information transmitted therebetween.

When a peripheral member, such as a preselection route selector, wants to be connected to a computer, it comes into the calling state by changing over a flip-flop forming part of it into the "one" position; if there are simultaneous calls from a number of peripheral members a logical circuit selects just one call in accordance with a predetermined program, for instance the call of the member of lower rank. The times at which access can be had to the two computers are determined by a single time base and are recurrent and interlaced, and the seizure of either computer brings a busy flip-flop into the "one" position to prevent access to the other computer. The selection and uniqueness of access are therefore achieved by a phase displacement in time associated with an interlocking feature for, as will be seen hereinafter, a call from a peripheral member to one computer cannot be processed and the call erased in the time allocation reserved for a given computer which is too short for a complete call processing.

When a computer wishes to be connected to a peripheral member, such as a final route selector or a junctor distributor, it tests for the availability of such member in respect of itself, as represented by the state of a first flip-flop, and also tests the said member of its availability in respect of the other computer, as denoted by the state of a second flip-flop. If the member is idle in respect of a computer wishing to be connected to it, the computer transfers the information to such member and tries to connect to the same. If the member is unavailable because of the other computer, its inavailability prevents connection and the transfer of the information and produces a non-connection and non-transfer signal in the calling computer. This prevents the testing time of the second flip-flop and the information transfer time from following one another and being cumulative.

The invention will now be described in detail with reference to the accompanying drawings wherein.

Figure 1:
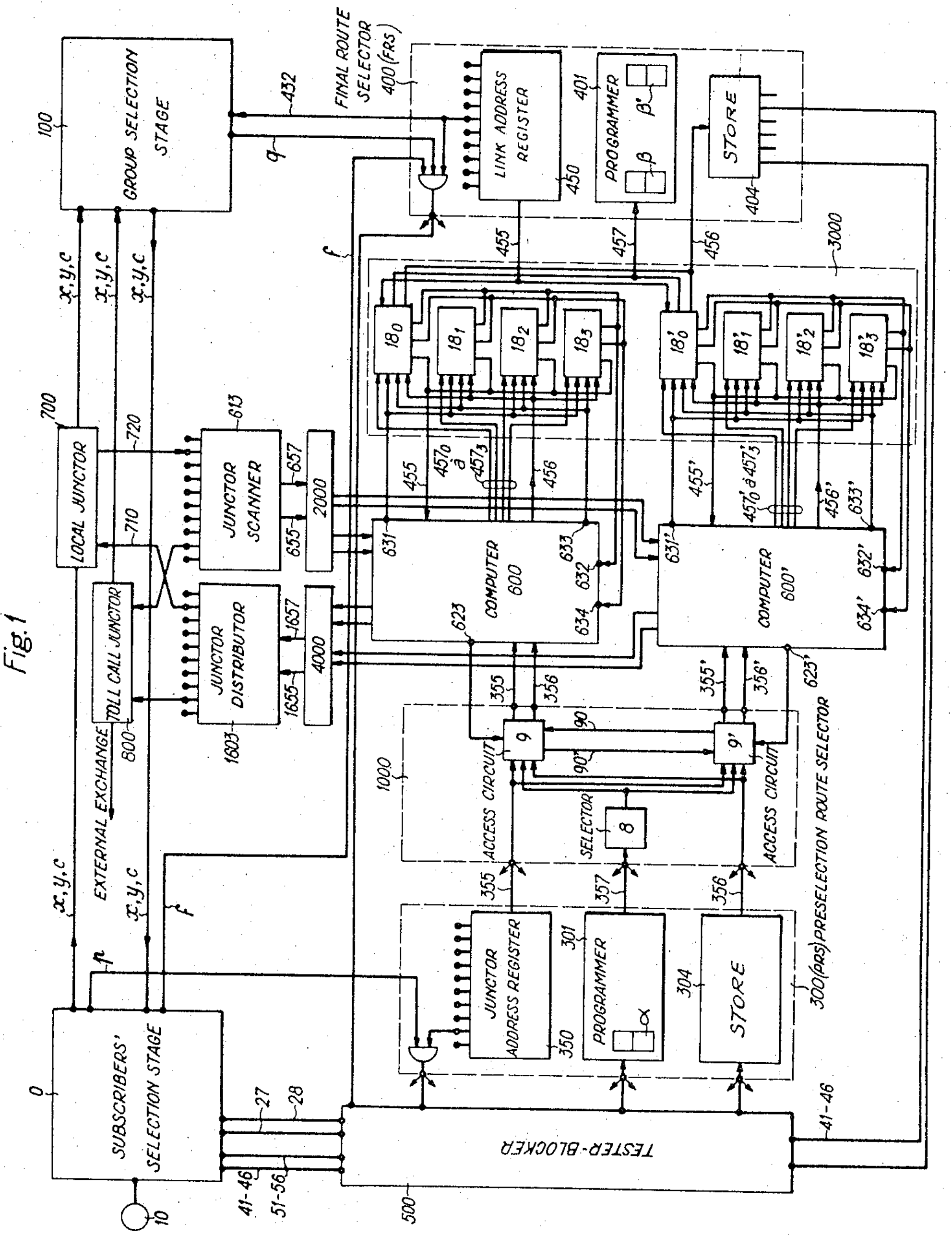
FIG. 1 is a view in block schematic form of automatic telephone switching equipment of that similar to the kind described in the aforesaid patent but comprising two computers.

Referring to FIG. 1, which is merely a diagrammatic form of FIGS. *4a*, *4b*, and *4c* of the aforesaid patent, except that in the preesent case there are two computers 600, 600' instead of one, a subscribers' selection stage 0 is provided which can form a satellite telephone exchange to which subscribers, as 10, are connected. The satellite is connected to the main exchange by four-wire preselection lines *x*, *y*, *c*, *p*, by four-wire final selection lines *x*, *y*, *c*, *f*, by two wires 27, 28 for exchanging switching signals with a testing and blocking element 500 in the main exchange and associated with the subscribers' selection stage, and by two six-wire lines one, 51–56, for transmitting in parallel the calling subscriber's number (and in some cases the called subscriber's number) from the satellite to a preselection route selector PRS 300 of the main exchange and the other, 41–46, for transmitting the subscriber's number at which the final route terminates from a final route selector FRS 400 of the main exchange to the satellite. The preselection routes start from the calling subscriber and extend to local junctors 700 where the wires *x*, *y*, *c* terminate; the wires *p* terminate at a junctor address register 350 which scans them sequentially.

The final routes have one part (the wires *x*, *y*, *c*, *f*) extending through the subscribers' selection stage 0 and one part (the wires *x*, *y*, *c*, *q*) extending through the group selection stage 100. The final routes for internal or local calls start from the internal-call junctor 700 marked during preselection and terminate at the called subscriber. The final routes for external or toll calls start from a toll call junctor 800—which is designated by the computer in place of the preselected local junctor in accordance with the called number—and terminate at the calling subscriber. The final routes meet through a link at which the wires *f* and *q* terminate. A link address register 450 scans the links sequentially.

The PRS's 300 of which it is assumed that four are provided, select the preselection routes along the lines described in the aforesaid patent register the number of the corresponding local junctor in the junctor address register 350, and register in the store 304 the number of the calling subscriber or the number of the called subscriber which the satellite transmits to them through the testing and blocking device 500.

The FRS's of which it will be assumed that four are provided, select the final routes along the lines described in the aforesaid patent after they have registered the number of the interstage link in the link address register 450 and after they have also registered in the store 404 the called subscriber's number received from the computer 600 or 600' which has obtained it from the local junctor 700 by analysing the calling subscriber's dialling signals through scanner 613. The FRS's re-transmit the calling or called subscriber's number via the testing and blocking device to the satellite which reports back on whether the called subscriber is free or busy and indicates performance or faults.

Clearly, therfore, each PRS 300 comprises a register 350 and a store 304 and each FRS 400 comprises a register 450 and a 404. Also, each PRS comprises a programmer 301 and each FRS comprises a programmer 401; the connections between each such programmer and the respective associated registers and stores 350, 304 and 450, 404 are not shown in FIG. 1. The programmer 301 comprises a flip-flop $\alpha$ whose function will be described with reference to FIG. 2 and the programmer 401 comprises two flip-flops $\beta$, $\beta'$ whose function will be described with reference to FIG. 3. In each PRS, flip-flop $\alpha$ is triggered on when (*i*) junctor address register 350 has stopped scanning and (*ii*) store 304 is filled in with a subscriber's number.

The above reminder of a prior art centralized control switching network is for the purpose to define what is meant by peripheral circuits or members which are to be connected to a computer among several or to which a computer has to connect, examples of information senders and the FRS's are examples of information receives and senders.

The PRS's can be connected to the computers 600, 600' via wires 355, 356, 357 and an access device 1000. The computers 600, 600' can be connected to the FRS's and vice versa via wires 455, 456, 457 and an access device 3000. The junctor scanners 613 can be connected to the computers 600, 600' via lines 655, 657 and an access device 2000, and the computers 600, 600' can be connected to junctor-marking distributors 1603 and vice versa via wires 1655, 1657 and an access device 4000.

The automatic switching equipment forming the subject matter of the aforesaid patent is disclosed therein to an extent sufficient to make it unnecessary to give further details here except in respect of the access devices for the PRS's, the FRS's and the junctor scanners and distributors.

The access devices which form the subject matter of this invention are the devices or systems 1000, 2000, 3000, 4000. Since the systems 1000, 2000 respectively associated with the PRS's 300 and the scanners 613 are similar (except that 300 has one register and one store memory whereas 613 has merely one register), and since the systems 3000, 4000 respectively associated with the FRS's and the distributors 1603 are similar (except that 400 has one register and one store while 1603 has one register), a detailed description will be given only of the systems 1000, 3000 with respective reference to FIGS. 2 and 3.

The system 1000 comprises a selecting circuit 8 which systematically selects simultaneous calls from the PRS's in a predetermined order, and two access circuits 9, 9' which, as will be seen in detail hereinafter, are decoupled in time by their access times being interlaced, such access times being distributed by the terminals 623, 623' of the computers 600, 600', and which block one another via the connections 90, 90'.

Figure 2:
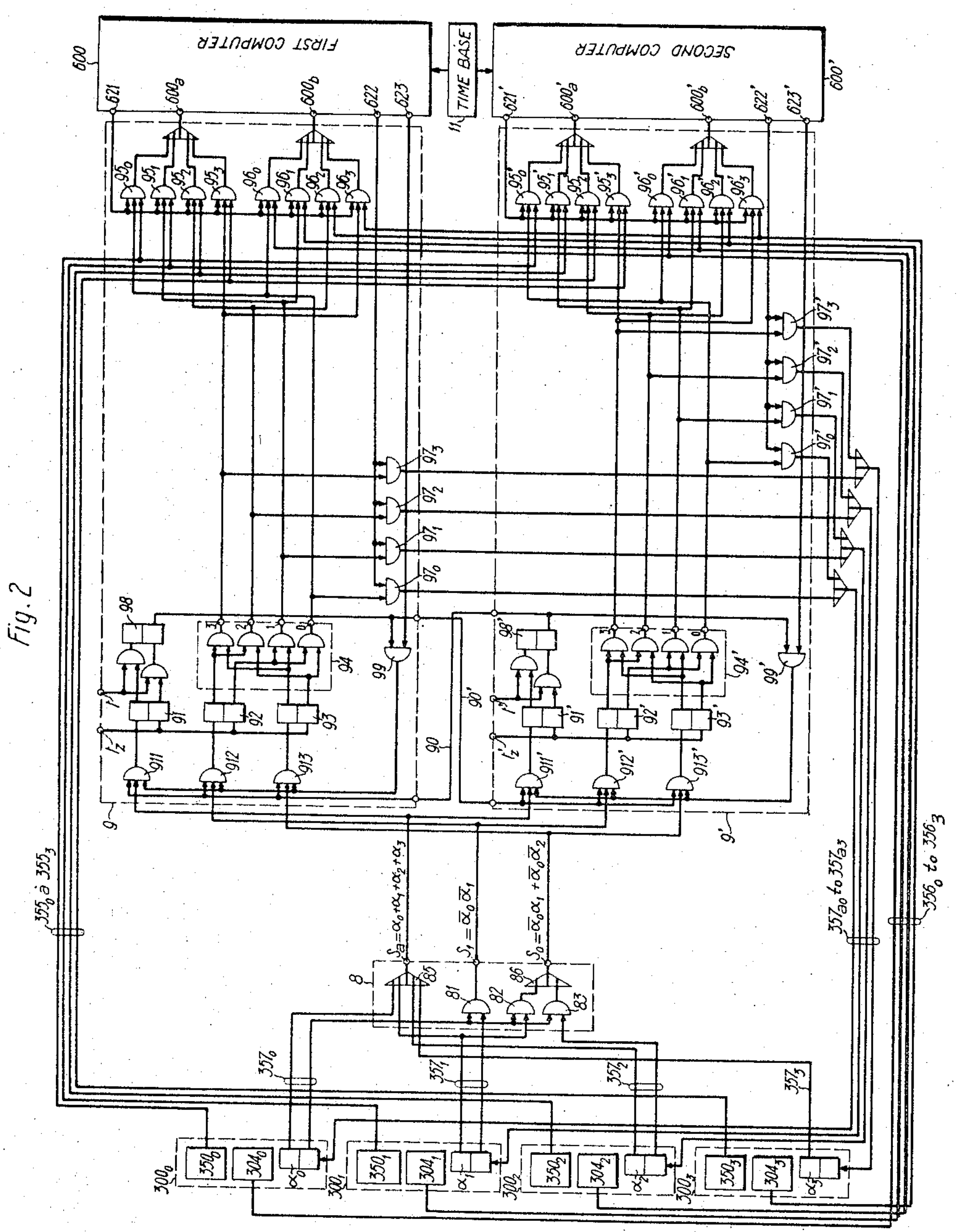
FIG. 2 shows the system for selectively giving the preselection route selectors access to the two computers, and also for giving the junctor scanners access to the two computers.

Referring now to FIG. 2, there are four PRS's $300_0$ to $300_3$ each comprising a junctor address register $350_0$ to $350_3$ respectively and a store memory $304_0$ to $304_3$ respectively. The purpose of the junctor address register is to denote the number of a junctor selected during the preselection process and able to be connected to the calling subscriber by a free preselection route; the purpose of the store is to record, as required, either the number of the subscribers' selection stage to which the calling subscriber belongs, and the number thereof in said stage or the number of the subscribers' selection stage to which the called subscriber belongs and the number thereof in said stage. Also, each PRS comprises a flip-flop belonging to the programmer 301 (FIG. 1) and having the respective references $\alpha_0$ to $\alpha_3$, each such flip-flop being in the "one" state when the corresponding PRS has the necessary preselection data recorded in its register and store.

The PRS's $300_0$ to $300_3$ can be connected either to the computer 600 or to the computer 600'; immediately they have received all the preselection data they start to call the two computers by their flip-flop $\alpha$ coming into the "one" states. The binary state of the flip-flops will be called $\alpha_0$, $\alpha_1$, $\alpha_2$, $\alpha_3$ respectively in the one state and $\bar{\alpha}_0$, $\bar{\alpha}_1$, $\bar{\alpha}_2$, $\bar{\alpha}_3$ respectively in the zero state.

The selecting circuit 8 supplies two circuits 9, 9' giving access to the computers 600 and 600' the following three items of binary data:

$$S_a=\alpha_0+\alpha_1+\alpha_2+\alpha_3$$

which by taking the value "one" indicates that at least one of the four PRS's is calling; and $$S_0=\bar{\alpha}_0\alpha_1+\bar{\alpha}_0\bar{\alpha}_2$$
$$S_1=\bar{\alpha}_0\bar{\alpha}_1$$

which form a two digit number $S_1$ $S_0$ indicating the number of the calling PRS and, if a plurality of PRS's are calling simultaneously, the number of whichever has the lowest rank, as can be more clearly gathered from the following table:

| Situation for calling PRS's | | | | Binary No. of selected PRS | | No. of PRS |
|---|---|---|---|---|---|---|
| $\alpha_0$ | $\alpha_1$ | $\alpha_2$ | $\alpha_3$ | $S_1$ | $S_0$ | |
| 0 | 0 | 0 | 0 | 1 | 1 | =not used |
| 0 | 0 | 0 | 1 | 1 | 1 | =3 |
| 0 | 0 | 1 | ∅ | 1 | 0 | =2 |
| 0 | 1 | ∅ | ∅ | 0 | 1 | =1 |
| 1 | ∅ | ∅ | ∅ | 0 | 0 | =0 |

∅ meaning 0 or 1.

The number of the calling PRS is determined along the lines just disclosed by the circuit 8 which comprises three AND-gates 81–83 and two OR-gates 85, 86.

The two computers operate under the control of a single time base 11 the first at times $t_0$ and the second at times $t'_0$ interlaced with the times $t_0$. Each computer tests the outputs $S_a$, $S_1$, $S_0$ of the circuit 8 and transfers the numbers $S_a$, $S_1$, $S_0$ to flip-flops 91–93 (or 91', 92', 93') via AND-gates 911–913 (or 911'–913') respectively; the conditions in which the same are open will be described hereinafter.

The number of the PRS is decoded in the decoder 94 (or 94') and the signals delivered by the outputs 0, 1, 2, 3 thereof actuate gates $95_0$ to $95_3$ (or $95'_0$ to $95'_3$) and gates $96_0$ to $96_3$ (or $96'_0$ to $96'_3$). Thus the junctor number is transferred to terminal $600_a$ (or $600'_a$) of computer 600 (or 600') via wires $355_0$ to $355_3$ and open gates $95_0$ to $95_3$ (or $95'_0$ to $95'_3$) and the number concerning the calling subscriber or the called subscriber is transferred to terminal $600_b$ (or $600'_b$) via wires $356_0$ to $356_3$ and open gates $96_0$ to $96_3$ (or $96'_0$ to $06'_3$). Gates $97_0$ to $97_3$ (or $97'_0$ to $97'_3$) of the release transfer control which resets the flip-flop $\alpha_0$ to $\alpha_3$ of the PRS's $300_0$ to $300_3$ are also open by the output signals of decoder 94. The transfer time is determined by the computer by a pulse at the terminal 621 (or 621'), and the zero resetting time of the PRS is determined by a pulse at the terminal 622 (or 622') connected to the gates $97_0$ to $97_3$ (or $97'_0$ to $97'_3$).

Since the two computers are out of phase with one another, there is no chance of the gates 911–913 being opened simultaneously with the gates 911'–913'; since the pulses for gating the numbers $S_a$, $S_1$, $S_0$ can be applied to the terminals 623 and 623' only at times $t_0$, $t'_0$, respectively, which are separated from one another by half a cycle of the time base, this minimum shift remains even if the two computers are at exactly the same point of their program of testing the calling PRS's. Let us assume that, with the flip-flops 98, 98' in the zero state, for instance, the computer 600 applies a gating pulse to the terminal 623 at a time $t_0$. Since the flip-flop 98 is in its zero state, the gate 99 is open, and since the flip-flop 98' is also in its zero state, the gates 911–913 are also open, the flip-flops 91–93 are positioned in accordance with the value of the digits $S_a$, $S_1$, $S_0$ and, more particularly, if at least one of the PRS's is calling, the flip-flop 91 comes into the one state. The gates connecting the outputs of the flip-flop 91 to the inputs of the flip-flop 98 open immediately afterwards at a time $t$ intermediate between the time $t_0$ of opening of the gate 99 and the time $t'_0$ immediately following $t_0$, and the result of the flip-flop 98 coming into the one state is to close the gate 99, with the result that the gates 911–913 close, and to close the gates 911'–913'. All inputs of the access system are therefore closed, and so with effect from the next time $t'_0$ the computer 600' cannot receive any PRS call for as long as the call which brought the flip-flop 98 into the one state has not been recorded in the computer 600 and then erased in the calling PRS by the computer 600. The call is erased by the flip-flop $\alpha$ of the calling PRS being restored to its zero state by means of a pulse transmitted at the terminal 622 of the computer 600 and routed to the corresponding wire, $357a_0$ to $357a_3$ respectively by one of the gates $97_0$ to $97_3$ in accordance with the address store in the flip-flops 92, 93 and appearing at the terminals of the decoder 94. The computer 600 then transmits a pulse $t_z$ to restore the flip-flops 91–94 to their zero state, so that at the next time $t$ the flip-flop 98 is returned to the zero state and "unlocks" the access system.

Exactly the same thing happens when the computer 600' tests the calling PRS's before the computer 600 does so.

The time $t_z$ follows the pulse applied at time $t_0$ to terminal 622 and it may occur anywhere in the sequence of times $t_0$ and $t'_0$ since at time $t_z$ there occurs only a deletion with the exclusion of any opening preparation for access gates 9 and 9'. On the contrary time $t$ is a time prior to $t_z$ which must be intermediate between $t_0$ and $t'_0$.

Figure 3:
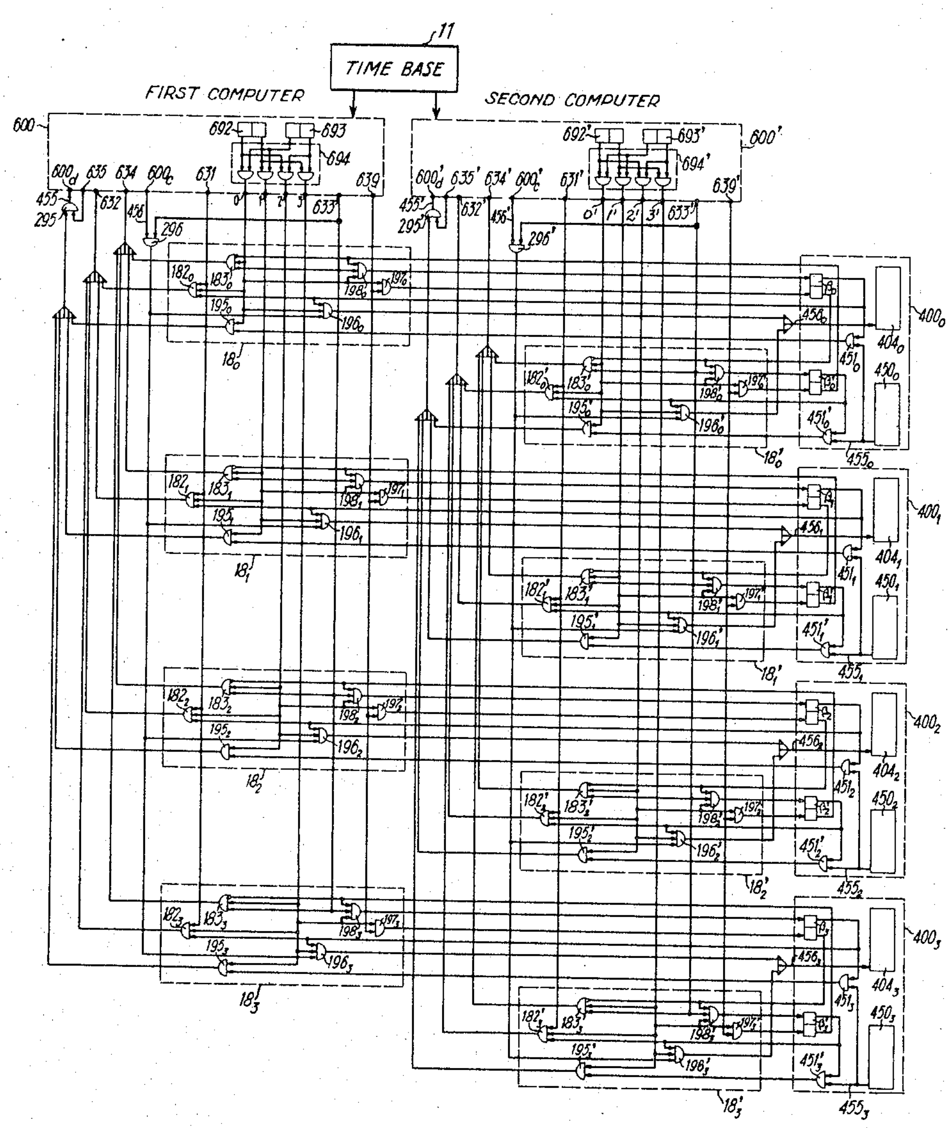
FIG. 3 shows the system for selectively giving the two computers access to the final route selectors, such system also being adapted to give the computers access to the junctor distributors.

FIG. 3 shows the device for giving the FRS's access to the two computers and vice versa. The FRS's $400_0$ to $400_3$ each comprise a link address register $450_0$ to $450_3$ respectively and a store $404_0$ to $404_3$ respectively. The function of the link address register is to find and store the number of a link connected to the called subscriber by a final route free route and to communicate such number to one of the computers, while the function of the store is to receive from one of the computers and register the number of the subscribers' selection stage to which the called subscriber belongs, and the number thereof. Each FRS also comprises a group of two flip-flops $\beta_0$–$\beta'_0$ to $\beta_3$–$\beta'_3$ which are in the zero or one position according as the FRS is free or has been seized by either of the computers 600 or 600'. In other words, the one or zero state of any flip-flop $\beta$ indicates that the corresponding FRS is or is not working, respectively, with the computer 600, while the one or zero state of any flip-flop $\beta'$ indicates that the corresponding FRS is or is not working, respectively, with the computer 600'. It is impossible for the $\beta$ and $\beta'$ flip-flops of any one FRS to be both in the "one" position. The function of the flip-flops is to close the inputs of a FRS of which they form part from the other computer, and to control the access of a computer to the store 404 of each FRS and the access of the register 450 of each FRS to a computer similarly to the access control of the two elements 350 and 304 of each PRS to the computer. Whereas, in the case of the PRS's junctor data and data concerning the number of the calling (or called) subscriber both went from the selector to the computers, in the case of the FRS's the data about the selected link go from the selector to the computers, and data on the junctor number and the number of the called or calling subscriber and of his selection stage go from the computers to the selector. As can be gathered from FIG. 3, when $\beta_0$ is in the one state it opens the output gates $451_0$ of the register $450_0$ and the input gates $196_0$ of the store $404_0$, and when $\beta'_0$ is in the one state it opens the output gates $451'_0$ of register $450_0$ and the input gates $196'_0$ of the store $404_0$ (gate $196_0$ and $196'_0$ are within control and connection circuits $18_0$ and $18'_0$ which will be disclosed hereinafter).

Each computer comprises a FRS address register comprising two flip-flops 692, 693 in the computer 600 and 692', 693' in the computer 600', associated with a decoder 694 in the case of the computer 600 and 694' in the case of the computer 600', each decoder having four outputs.

Access device 3000 comprises control and connection circuits $18_0$ to $18_3$ and $18'_0$ to $18'_3$ which are open or closed according to whether the flip-flops $\beta$ and $\beta'$ of the corresponding FRS is in state zero or one. Each computer 600 or 600' designates the FRS to which it wants to connect and, with this end in view, it applies a pulse to one of its terminals (0–3) or (0'–3').

When the computer 600 requires to seize a FRS, FRS $400_0$ for example, it sends via its terminal 631 a test pulse to test whether the flip-flop $\beta_0$ is in the one state, as it would be if the FRS $400_0$ was already operating for the computer 600. If the test of $\beta_0$ is negative—i.e., $\beta_0$ is in the zero state—the gate $182_0$ opens and the terminal 632 receives the pulse from terminal 631. The computer 600 then knows that the FRS $400_0$ is not being used by itself since $\beta_0$ is in the zero state. However, since the computer 600 does not know the state of $\beta'_0$ it still does not know whether or not the FRS $400_0$ is operating for the computer 600'.

To speed up the access time of the computer to the FRS's the computer 600, instead of starting by testing the state of $\beta'_0$, simultaneously transmits through terminal 633 the data transfer pulse and the test pulse of $\beta'_0$. If $\beta'_0$ is in the one state, the data are blocked and there is no transfer, the result of the test giving this information. If $\beta'_0$ is in the zero state, the information is transferred during the test, the result being reported to the computer by the result of the test. The test time and transfer time are therefore not cumulative one of another.

The computer 600 transmits a test pulse via its terminal 633 to test the state of $\beta'_0$ and simultaneously to seize the FRS $400_0$. If the test on $\beta'_0$ is positive—i.e., if $\beta'_0$ is in the one state—the gate $183_0$ is opened and a pulse is received via the terminal 634 of the computer 600 to indicate thereto that the FRS $400_0$ is working for the computer 600'. If the test is negative i.e., if $\beta'_0$ is in the zero state—the gate $198_0$ opens and the FRS $400_0$ is seized, its flip-flop $\beta_0$ changing over to the one state. The pulse for testing $\beta'_0$ is also used for gating information on the end points of the final route. Data concerning the subscribers' number and available at the terminals $600_c$ of the computer 600 is transmitted to the store $404_0$ of the FRS $400_0$ via the open gates 296 and $196_0$, the gate 296 having been opened by the gating pulse applied to the terminal 633 while the gate $196_0$ opens as a result of the decoder 694 being in the zero position and the flip-flop $\beta_0$ being in the one state. Upon the completion of selection operations the computer 600 informs itself of the result by applying a pulse to the terminal 635. The selection result data available in the register $450_0$ is transmitted from the FRS $400_0$ to the terminal $600_d$ of the computer 600 via the open gates $451_0$, $195_0$, 295, the gate $451_0$ having been opened by the flip-flop $\beta_0$ in the one state, the gate $195_0$ having been opened by the decoder 694 in the zero position, and the gate 295 having been opened by the transfer or gating pulse applied at the terminal 635.

The release of the FRS $400_0$ seized by the computer 600 is effected thereafter by transmission to the terminal 639 of a release pulse which passes through the gate $197_0$ opened by the decoder 694 in the zero position and restores the flip-flop $\beta_0$ to the zero state, to make the FRS $400_0$ available for the computer 600.

Figure 4:
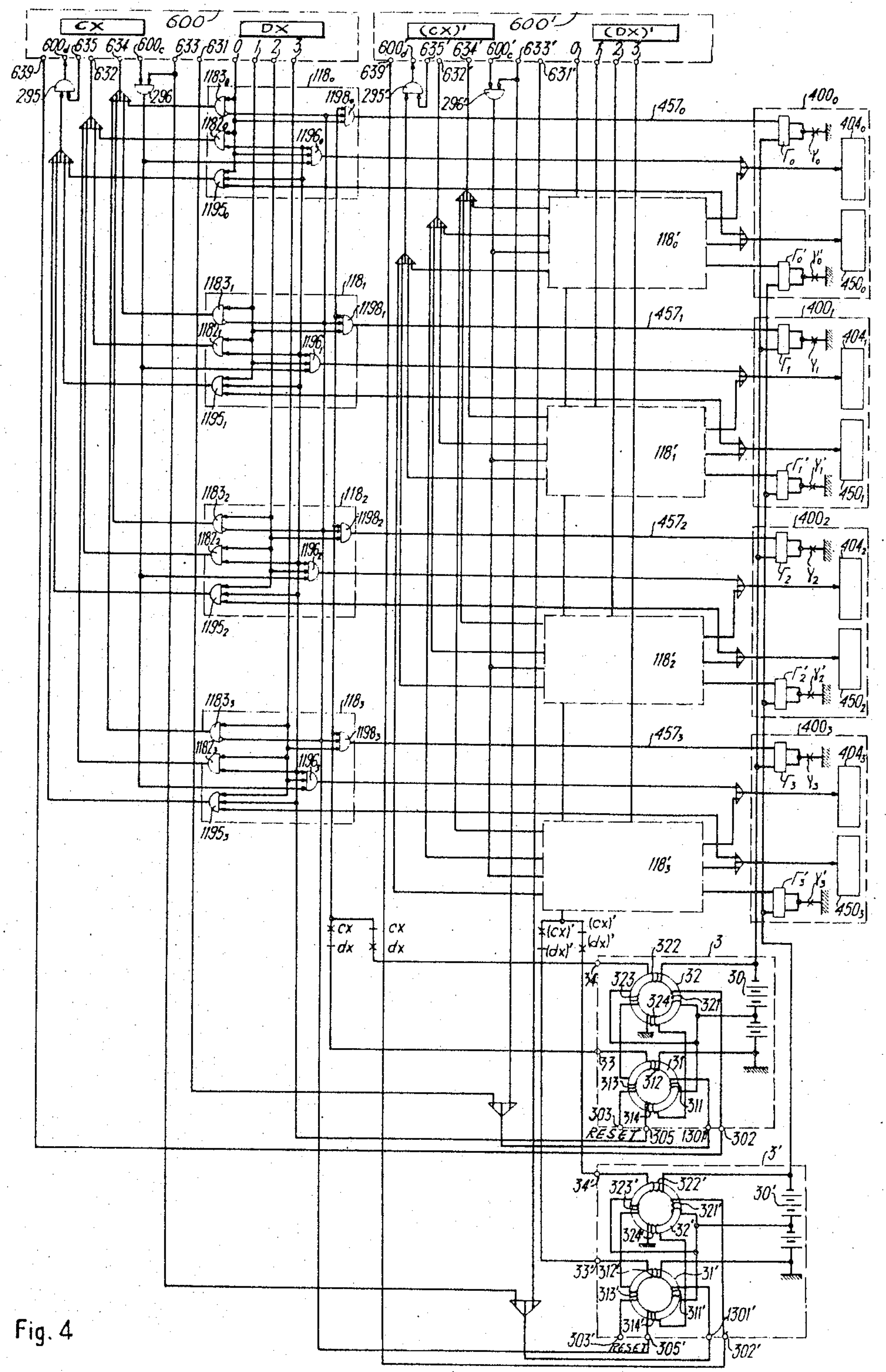
FIG. 4 is another embodiment of the access system of FIG. 3 in the case when the bistable circuit which marks the final route selectors idle or busy is no longer a flip-flop but a relay.

Referring now to FIG. 4 in which circuits identical or quite similar to those in FIG. 3 have been given the same reference numerals, control and connection circuits $118_0$–$118_3$ and $118'_0$–$118'_3$ are substituted for control and connection circuits $18_0$–$18_3$ and $18'_0$–$18'_3$ of FIG. 3. Within the FRS's relays $\Gamma_0$–$\Gamma_3$ and $\Gamma'_0$–$\Gamma'_3$ are substituted for flip-flops $\beta_0$–$\beta_3$ and $\beta'_0$–$\beta'_3$. Each of these relays, $\Gamma_0$ for example, comprises two serially connected half-windings the common point of which is grounded through a make contact $\gamma_0$ of the relay. The other end of the first half-winding is connected to the negative terminal of the current source 30 and the other end of the second half-winding is connected to the outgoing control wire $457_0$ of control and connection circuit $118_0$. The arrangement of all relays $\Gamma_0$–$\Gamma_3$ and $\Gamma'_0$–$\Gamma'_3$ is the same and the ends of their first half-windings are connected in parallel to the negative terminal of current source 30 as regards relays $\Gamma_0$–$\Gamma_3$ and to the negative terminal of current source 30' as regards relays $\Gamma'_0$–$\Gamma'_3$.

The relays are such that when their two half-windings are serially energized they are triggered on and can hold with only one half-winding energized. When the two half-windings are differentially energized, their fluxes cancel each other and the relays drop.

Computers 600 and 600' of FIG. 4 are the same as in FIG. 3 except that they comprise a connection relay CX and a disconnection relay DX and that terminal 639 is no longer a disconnection control terminal but a disconnection check terminal. When a computer, 600 for instance, wants to connect to or to disconnect from a FRS, it applies a pulse to one terminal 0–3 and energizes either the connection relay CX or the disconnection relay DX according to whether the computer order is a connection or a disconnection order. The FRS address registers 692–693 and 692'–693' and the associated decoders 694–694' are identical to those in FIG. 3 and are not shown in FIG. 4.

The access system of FIG. 4 comprises two testers 3 and 3' whose function is to give the computers checking information about the performance of the connection and disconnection orders. The two testers are identical and their elements have been given the same reference numerals non-primed for one tester and primed for the other and accordingly only tester 3 will be now disclosed.

Tester 3 comprises two similar rectangular hysteresis cycle ferrite cores 31 and 32 respectively associated with relays $\Gamma$ in state one and relays $\Gamma$ in state zero. Their windings are similar and they each have a write-in winding, a reset winding, a read-out winding and an interrogation or test winding.

(a) The write-in windings 312 and 322 are connected at one end to the grounded positive terminal of current source 30 and at the other end respectively to terminals 33 and 34. Terminal 33 is connected to the negative terminal of the current source 30 through make contact *cx* of connection relay CX, break contact *dx* of disconnection relay DX, the decoder formed by gates $1198_0$–$1198_3$ and the two serially connected half-windings of relays $\Gamma_0$–$\Gamma_3$. Current starts flowing through write-in winding 312 when CX is set to the operative state and DX to the inoperative state and stops flowing when one relay among relays $\Gamma_0$–$\Gamma_3$ is turned on and holds through the corresponding closed contact $\gamma_0$–$\gamma_3$. Current starts flowing through write-in winding 322 when CX is set to the inoperative state and DX to the operative state and stops flowing when the relay among $\Gamma_0$–$\Gamma_3$ which is energized drops its corresponding holding contact $\gamma_0$–$\gamma_3$. The cores being reset, a connection current flowing through write-in winding 312 will trigger core 31 into the one state and a disconnection current flowing through write-in winding 322 will trigger core 32 into the one state.

(b) The test windings 311 and 321 are connected to the interrogation terminals 1301 and 302.

(c) The read-out windings 314 and 324 are serially connected to read-out terminal 305.

(d) The reset windings 313 and 323 are serially connected to reset terminal 303.

Terminal 631 of computer 600 which in FIG. 3 served to test the state of flip-flops $\beta_0$–$\beta_3$ and which now serves in FIG. 4 to test the state of relays $\Gamma_0$–$\Gamma_3$ is connected to terminal 1301 of tester 3 and, in the same way, terminal 631′ of computer 600′ is connected to terminal 1301′ of tester 3′.

Terminal 633 of computer 600 which in FIG. 3 served to test the state of flip-flops $\beta'_0$–$\beta'_3$ and which now serves in FIG. 4 to test the state of relays $\Gamma'_0$–$\Gamma'_3$ is connected to terminal 1301′ of tester 3′ and, in the same way, terminal 633′ of computer 600′ is connected to terminal 1301 of tester 3.

Terminal 639 for checking disconnection orders is connected to test terminal 302 of tester 3 and, in the same way, terminal 639′ is connected to test terminal 302′ of tester 3′.

Gates 182$_0$–182$_3$ are replaced by gates 1182$_0$–1182$_3$. Gate 1182$_0$ for instance receives a signal through terminal 0 of computer 600 and a signal giving the state of relay $\Gamma_0$. This latter signal is derived from read-out terminal 305 of tester 3 in response to an interrogation pulse produced by computer 600 through terminal 631 and applied to test terminal 1301.

Gates 183$_0$–183$_3$ are replaced by gates 1183$_0$–1183$_3$. Gate 1183$_0$ for instance receives a signal through terminal 0 of computer 600 and a signal giving the state of relay $\Gamma'_0$. This latter signal is derived from read-out terminal 305′ of tester 3′ in response to an interrogation pulse produced by computer 600 through terminal 633 and applied to test terminal 1301′.

Gates 198$_0$–198$_3$ are replaced by gates 1198$_0$–1198$_3$. Gate 1198$_0$ for instance receives a signal through terminal 0 of computer 600 and a signal giving the state of relay $\Gamma'_0$. This latter signal is derived from read-out terminal 305′ of tester 3′ in response to an interrogeation pulse produced by computer 600 through terminal 633 and applied to test terminal 1301′.

Gates 195$_0$–195$_3$ are replaced by gates 1195$_0$–1195$_3$. Gate 1195$_0$ for instance receives a signal through terminal 0 of computer 600 and a signal giving the state of relay $\Gamma_0$. This latter signal is derived from read-out terminal 305 of tester 3 in response to an interrogation pulse produced by computer 600 through terminal 631 and applied to test terminal 1301.

Gates 196$_0$–196$_3$ are replaced by gates 1196$_0$–1195$_3$. Gate 1196$_0$ for instance receives a signal through terminal 0 of computer 600 and a signal giving the state of relay $\Gamma_0$. This latter signal is derived from read-out terminal 305 of tester 3 in response to an interrogation pulse produced by computer 600 through terminal 631 and applied to test terminal 1301.

Gates within control and connection circuits 118′–118′$_3$ are quite similar to the gates internal to control and connection circuits 118′$_3$–118′$_0$ and do not need any further disclosure.

Since many modifications and variations in the described arrangement can obviously be made without departing from the scope of the invention, it is intended that all matter in the foregoing description or shown in the accompanying drawings should be interpreted as illustrate and not in a limiting sense.

For example, the selecting circuit 8 has been disclosed in the case of four PRS's. If there were for instance eight PRS's with flip-flops $\alpha_0$ to $\alpha_7$, the selective circuit would have to produce, at four outputs, the following digits:

$$S_a=\sum_{i=0}^{i=7}\alpha_i$$

$$S_0=\bar{\alpha}_0[\alpha_1+\bar{\alpha}_2(\alpha_3+\bar{\alpha}_4(\alpha_5+\bar{\alpha}_6))]$$

$$S_1=\bar{\alpha}_0\bar{\alpha}_1[(\alpha_2+\alpha_3)+\bar{\alpha}_4\bar{\alpha}_5]$$

$$S_2=\bar{\alpha}_0\bar{\alpha}_1\bar{\alpha}_2\bar{\alpha}_3$$

What we claim is:

1. In a recorded program telephone switching system comprising two computers adapted to derive from data formed by at least a calling subscriber's number, a called subscriber's number and a junctor number information items necessary for controlling the switching process between said calling and said called subscribers, data senders adapted to store and transmit a first part of said data to said computers and data receivers-and-senders adapted to store and transmit a second part of said data and to receive and store said information items, a double test suppressing access device for selectively connecting said data senders and said data receivers-and-senders to said computers comprising in combination means for producing seizing pulses in said computers, the seizing pulses of one computer being interlaced with the seizing pulses of the other computer, first bistable circuits associated with each of said data senders and adapted to become operative when the associated data sender is calling for a computer, means connected to said first bistable circuits for selecting from a plurality of first bistable circuits simultaneously becoming operative the first bistable circuit having the lower rank, two gating means to the two computers connected to said selecting means, each of said gating means being associated with a computer and being operated by the seizing pulses of said computer and inhibited by the other gating means when operated, transferring means for said first part of data controlled by said gating means, second and third bistable circuits located by pairs in said data receivers-and-senders, the second bistable circuit and the third bistable circuit in each data receive-and-sender being respectively associated with one computer and the other computer, means in each computer for testing in a called data receiver-and-sender the second bistable circuit associated with said computer and the third bistable circuit associated with the other computer, and means responsive to said testing means for transferring said second part of data from said data receivers-and-senders to the computer and said information items from the computer to said data receivers-and-senders.

2. A double test suppressing access device for selectively connecting data senders and data receivers- and-senders to two computers according to claim 1 in which the means in each computer for testing in a called data receiver-and-sender the second bistable circuit associated with the other computer and the means for transferring the second part of data from said data receiver-and-sender and a computer and the information items from said computer to said data receiver-and-sender comprise first means for testing the second bistable circuit of said data receiver-and-sender and second means responsive to said first testing means for simultaneously testing the third bistable circuit of said data receiver-and-sender and transferring between said data receiver-and-sender and said computer the second part of data and the information items whereby the test time of the third bistable circuit and the transfer time of said second part of data and information items are not cumulative one of another and the transfer occurs or not according to whether the test of the third bistable circuit is positive or negative.

3. A double test suppressing access device for selectively connecting data senders and data receivers-and-senders to two computers according to claim 1 in which the second and third bistable circuits located by pairs in each data receiver-and-sender are relays with two serially connected half-windings whose common point is grounded through a make contact of the relays and the means in each computer for testing in a called data receiver-and-sender the second bistable circuit associated with a computer and the third bistable circuit associated with the other computer comprises a current source and two bistable rectangular hysteresis cycle magnetic cores having each a test circuit connected to a computer, a write-in circuit and a read-out circuit, the write-in circuit of the first magnetic core being connected between the grounded pole of the current source and the other pole of said source through the two serially connected half-windings of the relays forming the second bistacle circuits, the write-in circuit of the second magnetic core being connected between the grounded pole of the current source and the other pole of the source through the two serially connected half-windings of the relays forming the third bistable circuits, the read-out circuits of the two magnetic cores being connected to the two computers for giving thereto information about operation of the relays forming the second and third bistable circuits.

No references cited.

WILLIAM C. COOPER, *Primary Examiner.*